Patented Nov. 20, 1928.

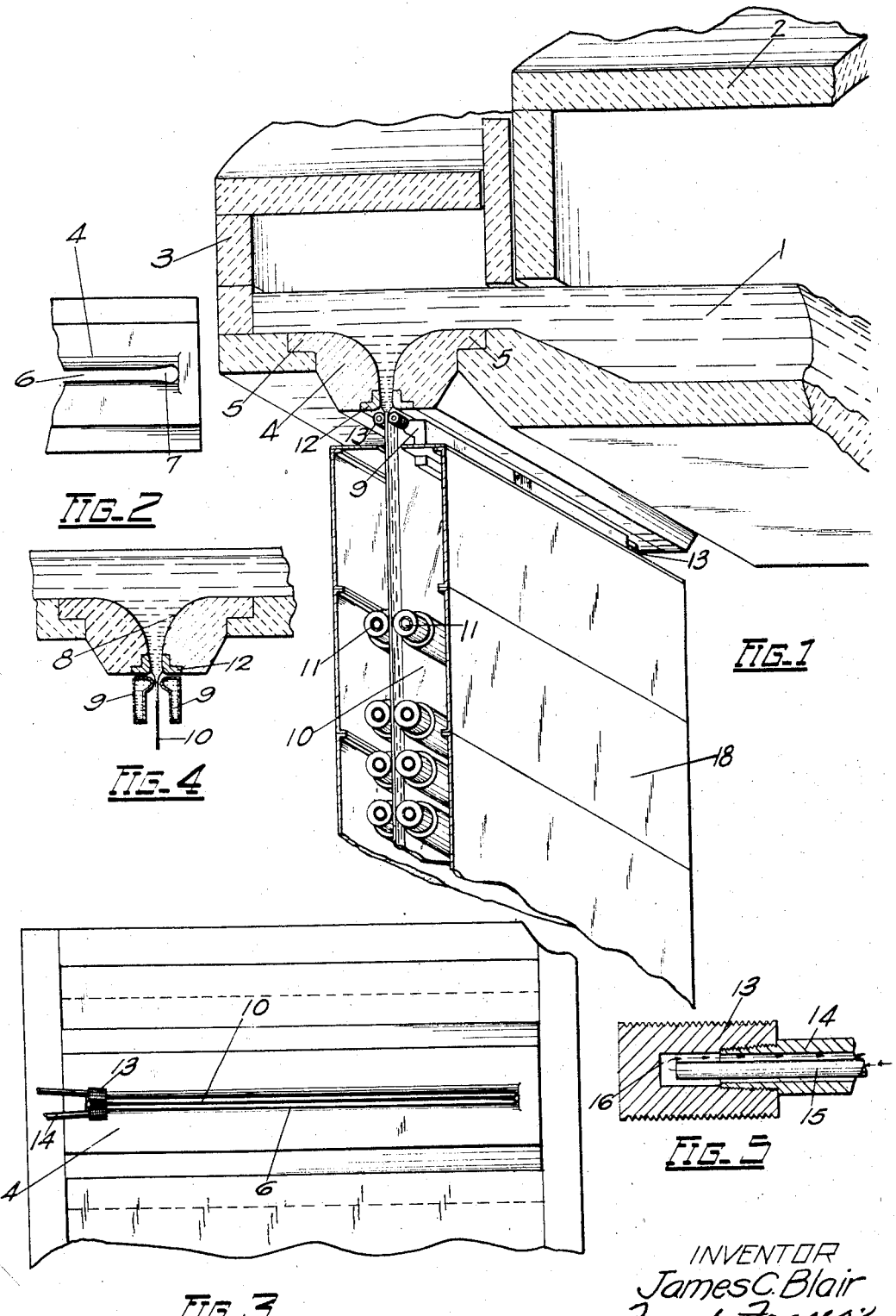

1,692,615

UNITED STATES PATENT OFFICE.

JAMES C. BLAIR, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS DOWNFLOW APPARATUS.

Application filed February 24, 1925. Serial No. 11,099.

This invention relates to improvements in the art of producing sheet glass, and more particularly to an improved method and apparatus for forming the sheet by flowing and drawing the molten glass downwardly through an elongated orifice in the bottom of the container.

According to this invention the slot or the orifice through which the molten glass flows downwardly is substantially wider than the thickness of the glass sheet which is to be formed. The molten stream flowing downwardly through this slot is cooled or chilled by a pair of water-cooled or air-cooled heat-absorbing members arranged closely adjacent the sides of the emerging stream, the glass thus being converted into a plastic mass which is stretched downwardly into sheet form by its own weight assisted by suitable drawing and guiding means which engage the formed sheet some distance below the orifice. Arranged directly below the slot and at the ends thereof are preferably rotatable knurled rolls which engage the edges of the sheet being formed to assist in forming the same and to form an edge thereon to hold the sheet to width after it has been formed, and to also assist in more rapidly forming the sheet, thus increasing the possible rate of draw. Immediately below the coolers the formed sheet passes into a closed annealing chamber wherein the sheet is tempered and annealed. This chamber is heated principally by the heat transmitted from the glass sheet itself.

In the drawings wherein like numerals are employed to designate like parts throughout the same:

Fig. 1 is a fragmentary sectional perspective view illustrating the apparatus in operation, Fig. 2 is a fragmentary plan view of the sheet-forming mechanism.

Fig. 3 is a bottom plan view of the device,

Fig. 4 is a transverse vertical section through the sheet-forming orifice, and

Fig. 5 is a longitudinal sectional view through one of the sheet-edge-forming devices.

The molten glass 1 is produced in the tank or furnace 2 from which it flows into the relatively shallow tank or flowing chamber 3. The main purpose of the shallow tank 3 is to reduce the head of glass above the flowing slot hereinafter described, and to facilitate the temperature control of the body of refined molten glass which supplies the sheet-forming mechanism.

In the bottom of the tank 3 is arranged the forming member or block 4 constructed of a suitable refractory material. At its upper edges this block has supporting flanges 5 which rest in suitable recesses in the surrounding blocks of the furnace. Extending vertically through the central portion of the block is the elongated longitudinal slot or orifice through which the molten glass flows to form the sheet. The shape and size of the orifice or slot can be changed to suit the desire, although in Fig. 2, I have shown the slot 6 as having a relatively large end 7 which is adapted to permit a sufficient flow of glass along the border portions of the sheet being drawn to form an edge thereon. The inner faces 8 of the slot 6 are adapted to curve and merge into the horizontal plane defined by the bottom of the pot 3. It is to be understood that the refractory member 4 can be formed from a non-corrosive alloy which may be internally heated or cooled to control the temperature thereof. Furthermore, the shape of the surfaces 8 and slot can be modified in any way desired. Immediately below the slot a pair of heat-absorbing shields 9 are provided and are arranged quite close to the edges of the slot so that they will absorb a considerable portion of the heat from the emerging glass and reduce it to such a plastic condition that it may be drawn downwardly into the form of a sheet 10 by the weight of the formed sheet assisted by the pairs of driven supporting and guiding rolls 11 positioned a considerable distance below the said slot. The frictional contact of the glass flowing through the slot in the refractory member 4 will reduce the temperature of the glass passing into the sheet to a point where, when it leaves the end of the slot, it will be viscous enough to withstand its own weight when acted upon by the heat-absorbing shields 9. The discharge end of the slot may be lined in those instances where it is formed from a refractory clay with a non-corrosive alloy tip 12 which will prevent the formation of lines and other surface defects in the sheet.

To assist in the formation of the edge of the sheet and to facilitate a more rapid drawing or flowing, a pair of rotatable preferably knurled rolls 13 are provided, one on each side of the sheet and at both edges thereof. Each roll 13 is supported on a hollow shaft 14 which contains a conduit 15 having a considerably smaller diameter. A cooling medium such as water or air may be circulated through the pipe 15, inner bore 16 of the roll 13, and may be permitted to pass out between the pipe 15 and shaft 14. The knurled rolls will absorb sufficient heat from the edges of the sheet being formed to create a fairly stiff edge which will maintain the sheet to width after it has been formed. In addition, the knurled rolls will control the amount of glass passing into the border portions.

The glass sheet 10 which is drawn downwardly from the plastic mass of glass emerging through the slotted orifice between the coolers 9 passes almost immediately into the closed annealing chamber 18 which entirely surrounds the sheet and drawing mechanism for a considerable distance below the cooling zone. This chamber 18 is of comparatively small cross-section and is heated almost entirely by the heat drawn out from the glass sheet 10. As the sheet passes downwardly through the gradually cooling atmosphere in this chamber 18, it will be annealed, and after passing out the lower end it may be divided into sheet sections in any approved manner. The chamber also prevents access to the forming glass sheet of dirt and disturbing air currents.

With this type of apparatus a sheet of glass may easily be formed by flowing a mass of molten glass through an elongated orifice formed in the bottom of the container holding the glass. The frictional resistance or contact caused by the refractory member and the inherent tendency of plastic glass to adhere to such substances will permit a uniform thickness of sheet to be flowed or drawn through the slot. The sheet may be permitted to flow of its own accord, or it may be drawn more rapidly than the natural flow through the slot, this depending upon the thickness of sheet desired. The sheet is held to width by the edge-forming means 13 which create a relatively tough edge on the sheet capable of maintaining the same to width after it has been formed. It is to be understood that the shape of the knurled rolls 13 can be modified to suit the desires of the particular user.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The method of forming sheet glass, consisting in flowing glass downwardly from a container through a passage having enlarged relatively wide openings at its opposite ends, and providing means below the relatively wide openings to control the flow of glass into the border portions of the sheet being formed.

2. In an apparatus for producing sheet glass, the combination of a container for molten glass provided with a submerged elongated discharge outlet wider at each end than at its center, and means below the outlet and adjacent the end portions thereof for engaging the edge portions of the sheet to hold the same to width.

3. In an apparatus for producing sheet glass, the combination of a container for molten glass provided with a submerged elongated discharge outlet wider at each end than at its center, means below the outlet and adjacent the end portions thereof for engaging the edge portions of the sheet to hold the same to width, and means intermediate the outlet and said last named means for absorbing heat from the body portion of the sheet.

Signed at Toledo, in the county of Lucas, and State of Ohio, this 21st day of February, 1925.

JAMES C. BLAIR.